(12) United States Patent
Itabashi et al.

(10) Patent No.: US 6,773,028 B2
(45) Date of Patent: Aug. 10, 2004

(54) VEHICLE AIR BAG STRUCTURE

(75) Inventors: Takeyasu Itabashi, Saitama (JP); Satoshi Iijima, Saitama (JP); Yosuke Matsuoka, Saitama (JP)

(73) Assignee: Honda Giken Kogyo Kabushiki Kaisha, Minato-Ku (JP)

( * ) Notice: Subject to any disclaimer, the term of this patent is extended or adjusted under 35 U.S.C. 154(b) by 1 day.

(21) Appl. No.: 10/092,555

(22) Filed: Mar. 8, 2002

(65) Prior Publication Data

US 2002/0130496 A1 Sep. 19, 2002

(30) Foreign Application Priority Data

Mar. 8, 2001 (JP) ........................................ 2001-065722

(51) Int. Cl.[7] .............................................. B60R 21/22
(52) U.S. Cl. .................... 280/730.1; 280/734
(58) Field of Search ........................ 280/730.1, 730.2, 280/734

(56) References Cited

U.S. PATENT DOCUMENTS

| | | | | |
|---|---|---|---|---|
| 3,623,768 A | * | 11/1971 | Capener et al. | 297/330 |
| 3,630,472 A | * | 12/1971 | Axenborg | 244/32 |
| 3,981,520 A | * | 9/1976 | Pulling | 280/730.2 |
| 4,227,717 A | * | 10/1980 | Bouvier | 280/753 |
| 5,072,966 A | * | 12/1991 | Nishitake et al. | 280/730.2 |
| 5,172,790 A | * | 12/1992 | Ishikawa et al. | 180/268 |
| 5,222,761 A | * | 6/1993 | Kaji et al. | 280/730.2 |
| 5,470,103 A | * | 11/1995 | Vaillancourt et al. | 280/730.1 |
| 5,564,736 A | * | 10/1996 | Kim | 280/730.2 |
| 5,575,497 A | * | 11/1996 | Suyama et al. | 280/730.1 |
| 5,586,782 A | * | 12/1996 | Zimmerman et al. | 280/730.2 |
| 5,693,987 A | * | 12/1997 | Krucoff | 307/10.2 |
| 5,911,434 A | * | 6/1999 | Townsend | 280/730.2 |
| 5,967,545 A | * | 10/1999 | Iijima et al. | 280/730.1 |
| 6,007,090 A | * | 12/1999 | Hosono et al. | 280/730.2 |
| 6,113,133 A | * | 9/2000 | Iijima et al. | 280/730.1 |
| 6,231,069 B1 | * | 5/2001 | Yokoyama | 280/730.2 |

* cited by examiner

Primary Examiner—Paul N. Dickson
Assistant Examiner—Toan C To
(74) Attorney, Agent, or Firm—Birch, Stewart, Kolasch & Birch, LLP

(57) ABSTRACT

A motorcycle having a passenger seat at the center of vehicle body frame, has side members guarding the left and right sides of a passenger M sitting on the passenger seat with air bags in the side members for expanding the air bags in case of necessity. As the structure has the side members guarding the left and right sides of the passenger, the structure can reinforce the vehicle body frame. Further, since the structure includes the air bags in the side members, it can contribute to the protection of the passenger.

15 Claims, 5 Drawing Sheets

US 6,773,028 B2

VEHICLE AIR BAG STRUCTURE

CROSS-REFERENCE TO RELATED APPLICATIONS

The present application claims priority under 35 USC 119 to Japanese Patent Application No. 2001-065722 filed on Mar. 8, 2001 the entire contents thereof are hereby incorporated by reference.

BACKGROUND OF THE INVENTION

1. Field of the Invention

The present invention relates to a vehicle air bag structure in a vehicle having a passenger seat at the center of vehicle body frame.

2. Description of Background Art

FIG. 5 is a side view of conventional motorcycle. A motorcycle 100 includes a roof to provide an all-weather scooter. The motorcycle includes a vehicle body frame 101 with a head pipe 102 attached to a front part of the vehicle body frame 101. A front fork 103 is attached to the head pipe 102 with a front wheel 104 attached to the front fork 103. A handlebar 105 is connected to the front fork 103. A power unit (not shown) is provided in a central lower part of the vehicle body frame 101. A swing unit 107 is attached to a rear part of the vehicle body frame 101 with a rear wheel 108 attached to a rear part of the swing unit 107. A passenger seat 109 is provided at the center of the vehicle body frame 101. A body cover 111 covers the vehicle body frame 101 with a front support member 112 extending upwardly from the front section side of the vehicle body frame 101, a rear support member 113 extending from the rear section side of the vehicle body frame 101, and a roof 114 supported by the members 112 and 113.

In recent years, it is standard for four-wheel vehicles to include equipment to protect the passengers such as a seat belt, an air bag and a child seat. In motorcycles, the time the time has arrived for the employment of techniques to contribute to the protection of a passenger upon the application of an impactive load to a vehicle body.

SUMMARY OF THE INVENTION

Accordingly, an object of the present invention is to provide a technique to contribute to the protection of a passenger upon the application of an impactive load to a vehicle body, especially upon the application of a shock applied to a side of motorcycle, or when the motorcycle is greatly lopsided.

To attain the above-described object, a vehicle air bag structure is provided for a vehicle having a passenger seat at the center of vehicle body frame. The structure includes side members guarding the left and right sides of a passenger sitting on the passenger seat and air bags disposed in the side members, so as to expand the air bags in case of necessity.

The structure including the side members guards the left and right sides of the passenger to reinforce the vehicle body frame and since the structure has the air bags in the side members it contributes to the protection of the passenger.

As a result, upon application of an impact load to the vehicle, the impact load applied to the passenger can be mitigated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Working examples of the present invention will be described with reference to the attached drawings. Note that "front," "rear," "left," "right," "upward" and "downward" are viewed along directions as seen by a passenger. Fr indicates a front side, Rr a rear side, L a left side, and R a right side.

Figure 1:
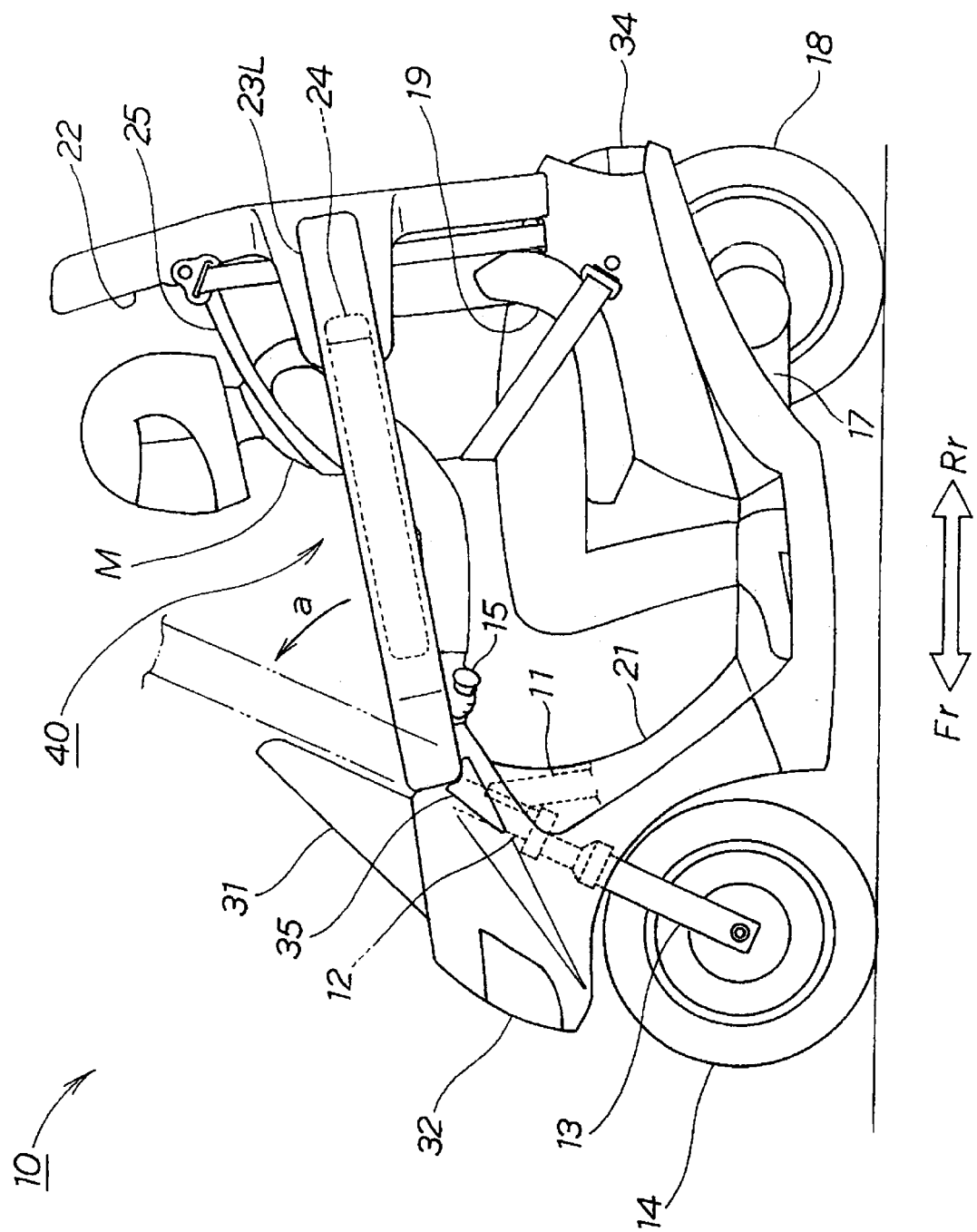
FIG. 1 is a side view of the motorcycle on which the vehicle air bag structure according to the present invention is mounted.

FIG. 1 is a side view of a motorcycle having a vehicle air bag structure according to the present invention.

A motorcycle 10 is a scooter type vehicle that includes a vehicle body frame 11, a head pipe 12 attached to a front part of the vehicle body frame 11, a front fork 13 attached to the head pipe 12, a front wheel 14 attached to the front fork 13 and a handlebar 15 connected to the front fork 13. A power unit (not shown) is provided in a central lower part of the vehicle body frame 11. A swing unit 17 is attached to a rear part of the vehicle body frame 11 with a rear wheel 18 attached to a rear part of the swing unit 17. A passenger seat 19 is provided at the center of the vehicle body frame 11 with a body cover 21 covering the vehicle body frame 11. A seat back 22 is set in the rear part of the vehicle frame 11 with left and right side members 23L, 23R (23R is not shown) crossing from a central part of the seat back 22 to the front part of the vehicle body frame 11. Air bags 24, 24 (one 24 is not shown) are accommodated in the side members 23L, 23R.

In FIG. 1, a seat belt 25, a wind screen 31, a head light 32, a tail lamp 34 and a blinker lamp 35 are operatively mounted on the frame. The left and right side members 23L, 23R are reinforcing members that provide a covering adjacent to the shoulders of passenger M. The members are frontward-rotatably attached on the front end side of the side members 23L, 23R as a supporting point, such that the members are rotated as indicated by an arrow a for ingress and egress.

Figure 2:
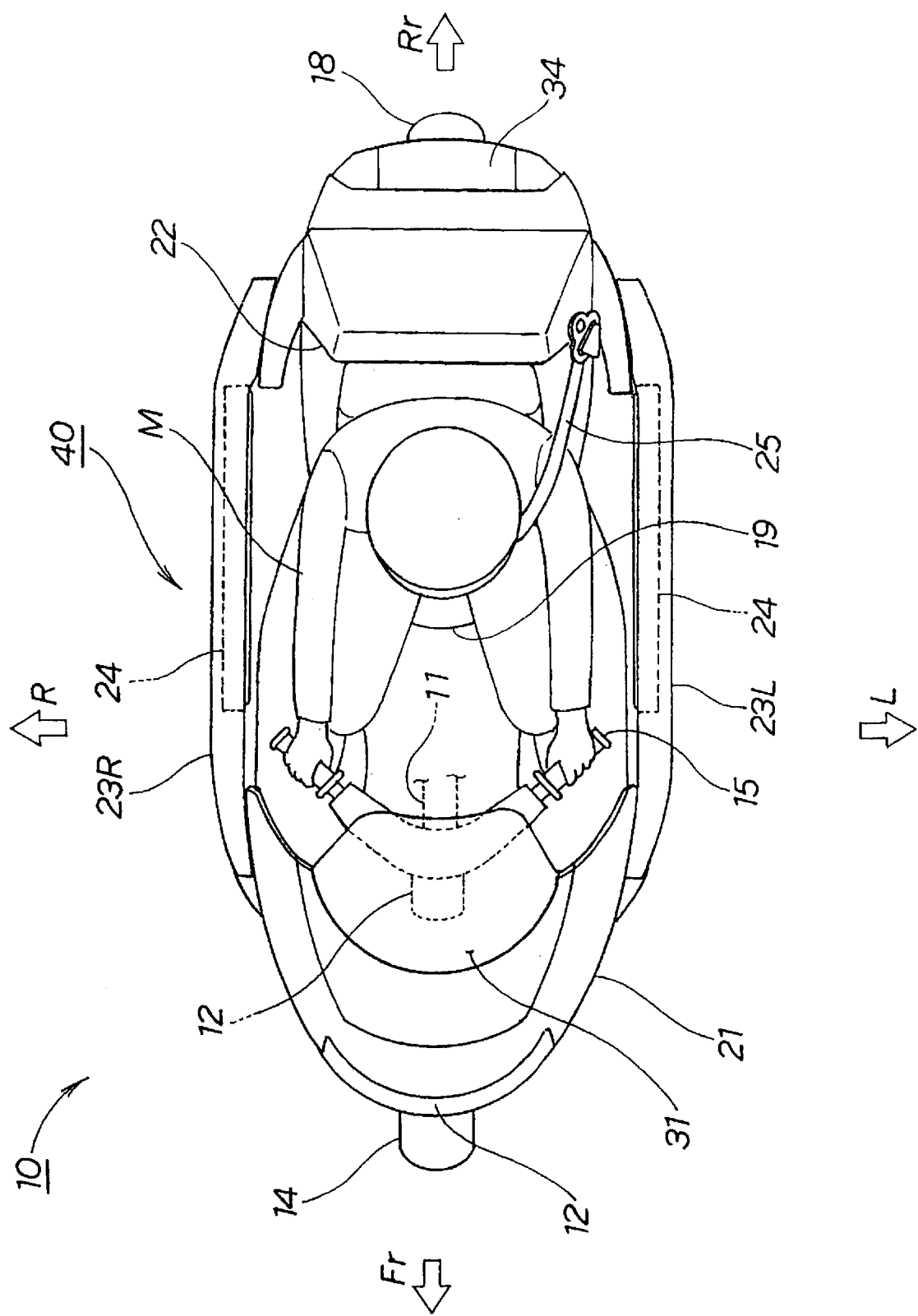
FIG. 2 is a plan view of the motorcycle on which the vehicle air bag structure according to the present invention is mounted.

FIG. 2 is a plan view of the motorcycle that includes the vehicle air bag structure according to the present invention. The vehicle air bag structure 40 includes side members 23L, 23R guarding the left and right sides of the passenger M positioned on the passenger seat 19. The air bags 24, 24 in the side members 23L, 23R expand in the case of an accident or other occurrence.

The structure including the side members 23L and 23R guarding the left and right sides of the passenger M, provide reinforcement for the vehicle body frame 11, and as the structure has the air bags 24, 24, in the side members 23L, 23R, it contributes to protection of the passenger M.

As a result, upon application of an impact load to the motorcycle 10 (vehicle), the impact load to the passenger M can be mitigated.

The operation of the above-described vehicle air bag structure 40 will be described next.

Figure 3A:
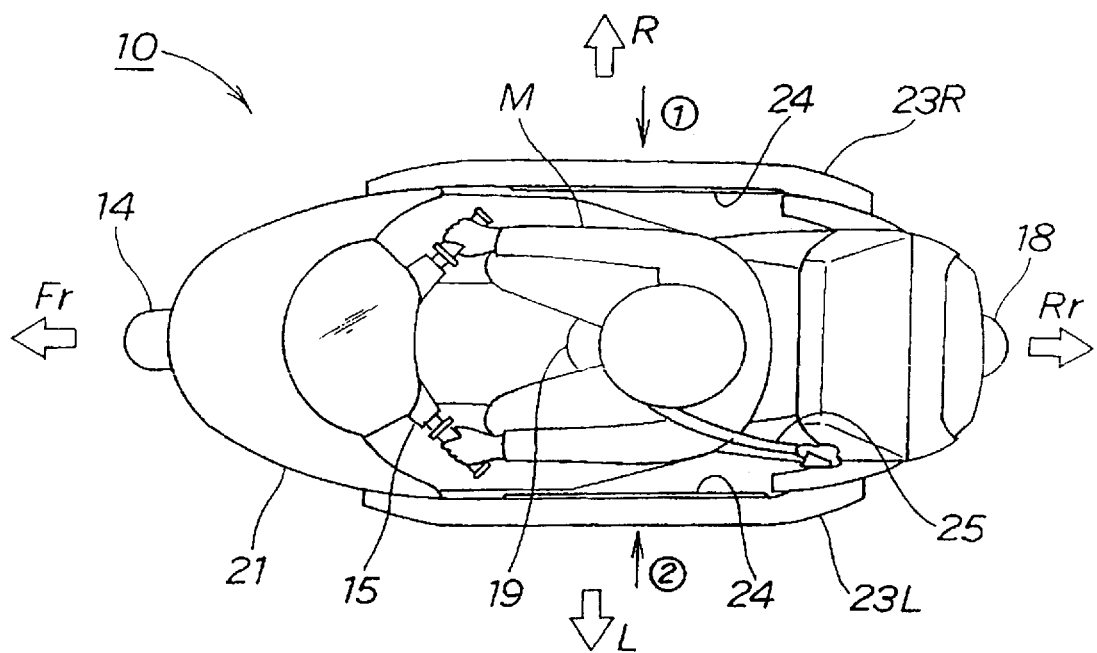
FIG. 3 is an operational explanatory view of the vehicle air bag structure according to the present invention.
Figure 3B:
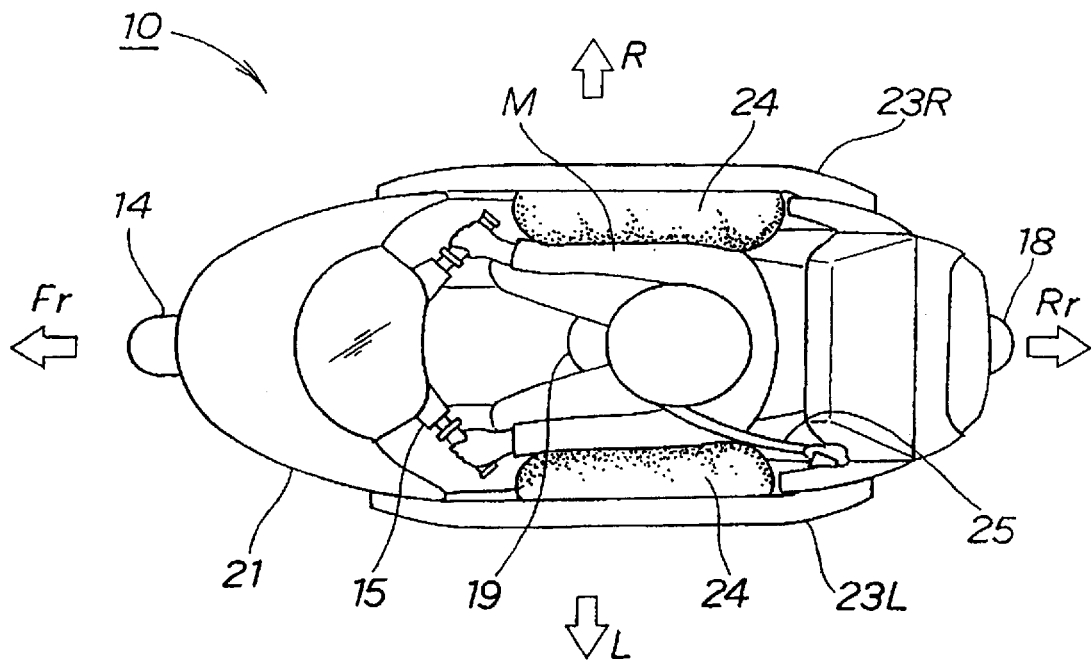

FIGS. 3(a) and 3(b) are operational explanatory views of the vehicle air bag structure according to the present invention.

In FIG. 3(a), for example, an impactive load is applied as indicated by an arrow 1 or an arrow 2 from the side of the motorcycle 10.

In FIG. 3(b), the air bags 24, 24 are expanded.

The structure includes the side members 23L, 23R for guarding the left and right sides of the passenger M sitting on the passenger seat 19 and includes the air bags 24, 24 positioned in the side members 23L, 23R. This contributes to the protection of the passenger M.

Figure 4:
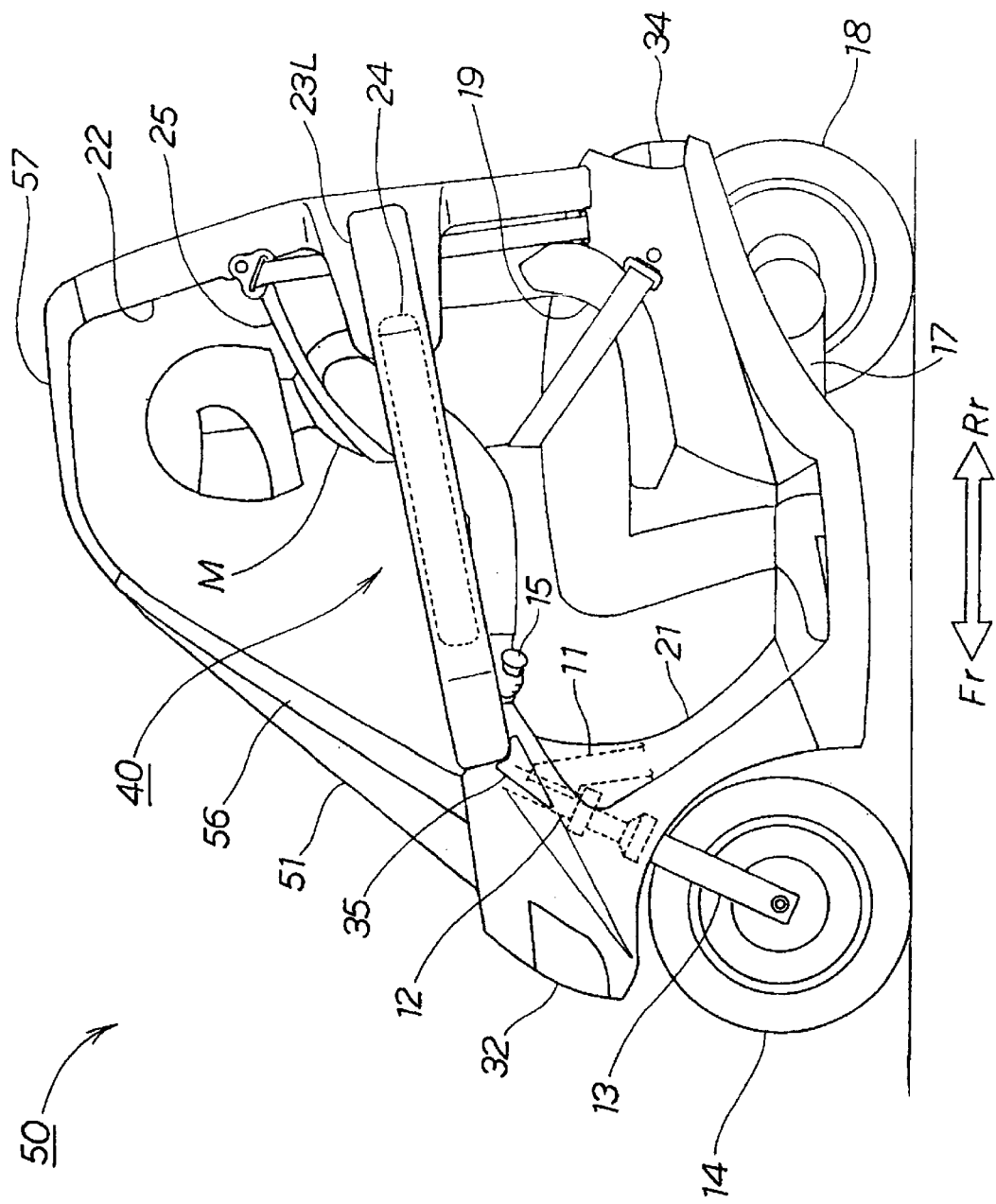
FIG. 4 is a side view of the motorcycle of another embodiment wherein the vehicle air bag structure according to the present invention is mounted.
Figure 5:
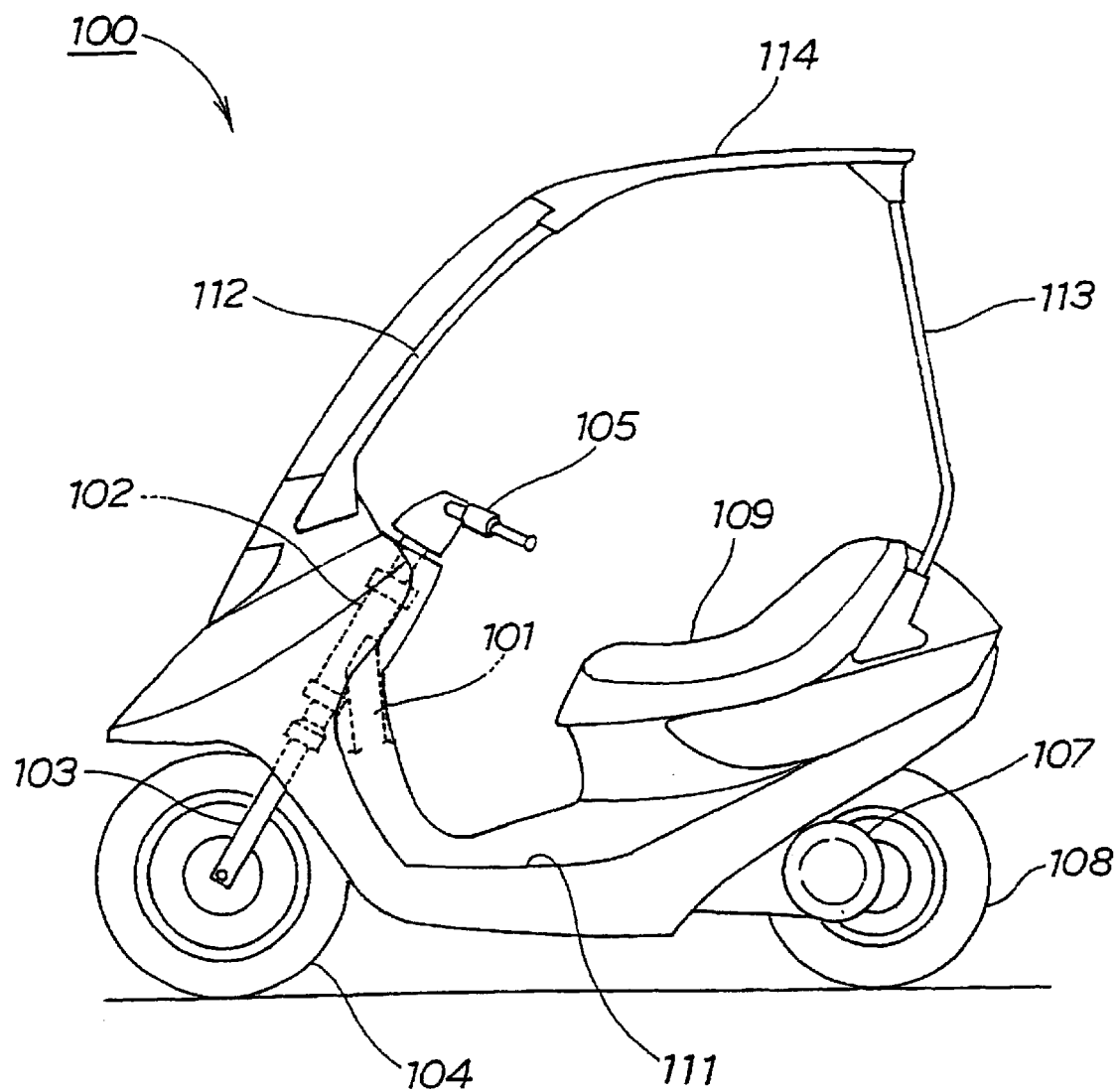
FIG. 5 is a side view of a conventional motorcycle.

FIG. 4 is a side view of the motorcycle according to another embodiment of the vehicle air bag structure according to the present invention. Note that same parts as those of the motorcycle 10 shown in FIG. 1 have the same reference numerals, and the detailed explanations thereof will be omitted.

In FIG. 4, a vehicle body frame 11 is connected to a head pipe 12. A front fork 13 includes a front wheel 14 secured thereto with a handlebar 15 mounted on the front fork 13. A swing unit 17 includes a rear wheel 18 mounted thereon. A passenger seat 19 together with a body cover 21 and a seat back 22 are mounted on the vehicle body frame 11. Side members 23L, 23R (23R is not shown) are included with air bags 24, 24 (one 24 is not shown) mounted within the side members 23L, 23R. A seat belt 25 is secured adjacent to the passenger seat 19. A head light 32, a tail lamp 34 and a blinker lamp 35 are operatively mounted on the vehicle body frame 11. A motorcycle 50 is an all-weather scooter type vehicle. By arranging the front support members 56, 56 (rear 56 is not shown) to extend upwardly from a side front part of the vehicle body frame 11, a window screen 51 may be attached between the front support members 56, 56, and a roof 57 is set on an upper end of the seat back 22 and extends from the front support members 56, 56 so as to be connected with the wind screen 51. That is, the motorcycle 50 is also a scooter adopting the vehicle air bag structure 40.

Note that in the working examples, as shown in FIG. 1, the air bags 24, 24 are attached to the motorcycle 10, however, the vehicle is not limited to a motorcycle, but the vehicle may be a bicycle, a tricycle or a four-wheeled vehicle. That is, an off-road vehicle such as a buggy or an agricultural vehicle are included.

In the working examples, as shown in FIG. 1, the side members 23L, 23R are respectively provided on the left and right sides, however, the invention is not limited to this arrangement, but two or more side members may be provided on the left and right sides.

In the working examples, as shown in FIG. 1, the side members 23L, 23R have a constant width, however, the width is not limited to a constant width, but the side members may have various widths in accordance with the shape of the air bags or the like.

In the working examples, as shown in FIG. 1, the side members 23L, 23R are respectively provided on the left and right sides within the range of vehicle length, however, the invention is not limited to this arrangement. It may be arranged such that these side members extend in the frontward and rearward directions of the vehicle and ends of these side members are connected with each other, thereby the side members work as a front bumper and a rear bumper. Further, the front bumper and rear bumper may be provided as separate members. Further, by setting the front bumper and rear bumper to a height that is at the same level of bumpers of four-wheel vehicle, a further passenger protection effect can be expected.

In the working examples, as shown in FIG. 1, the air bags 24, 24 are expanded upon the application of an impact load to the motorcycle 10. However, the expansion is not limited to this arrangement. For example, it may be arranged such that an angle sensor is provided in the vehicle body and the air bags are expanded when the vehicle body has turned at an angle greater than a predetermined angle. Further, the arrangements may be combined.

In the working examples, as shown in FIG. 1, the side members 23L, 23R are rotated on the front end as a supporting point in the vehicle frontward direction, openably/closably. However, the invention is not limited to this arrangement. The side members may be opened/closed outwardly on the front end as the supporting point, or may be rotated upward/downward or opened/closed outwardly on a supporting point provided on the rear end, or the side members may be removable from the vehicle as long as they are openable/closable for ingress and egress or the like.

The present invention exerts the following effects by the above-described structure. In the present invention, the vehicle, having the passenger seat at the center of the vehicle body frame, has the side members guarding the left and right sides of the passenger sitting on the passenger seat, and the air bags in the side members, so as to expand the air bags in case of necessity.

Since the structure that includes the side members guard the left and right sides of the passenger, it can reinforce the vehicle body frame. Further, the structure includes the air bags in the side members to contribute to the protection of the passenger.

As a result, upon application of impactive load to the vehicle, the impactive load applied to the passenger can be mitigated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle air bag structure for a motorcycle having a passenger seat at the center of motorcycle body frame comprising:

a left side member for guarding a left side of a passenger positioned on said passenger seat;

a right side member for guarding a right side of a passenger positioned on said passenger seat; and air bags being operatively positioned with each of the left and right side members;

wherein upon a predetermined condition, both said air bags expand for protecting the passenger.

2. The motorcycle air bag structure for a motorcycle according to claim 1, wherein said left side member includes a first end and a distal end, said first end being hinged to a forward frame of said motorcycle for enabling said left side member to be pivoted for permitting ingress and egress to said motorcycle.

3. The motorcycle air bag structure for a motorcycle according to claim 1, wherein said right side member includes a first end and a distal end, said first end being hinged to a forward frame of said motorcycle for enabling said right side member to be pivoted for permitting ingress and egress to said motorcycle.

4. The motorcycle air bag structure for a motorcycle according to claim 1, wherein said left side member includes a first end, a distal end and is constructed of a predetermined thickness, one of said air bags being disposed within said predetermined thickness during normal use and being expanded outside said left side member upon the occurrence of said predetermined condition for protecting a passenger.

5. The motorcycle air bag structure for a motorcycle according to claim 1, wherein said right side member includes a first end, a distal end and is constructed of a predetermined thickness, one of said air bags being disposed within said predetermined thickness during normal use and being expanded outside said right side member upon the occurrence of said predetermined condition for protecting a passenger.

6. The motorcycle air bag structure for a motorcycle according to claim 1, wherein said predetermined occurrence is an accident that deploys the air bags.

7. The motorcycle air bag structure for a motorcycle according to claim 1, wherein said predetermined occurrence is the turning of the motorcycle to a predetermined angle that deploys the air bags.

8. The motorcycle air bag structure for a motorcycle according to claim 1, wherein said motorcycle includes front support members with a roof disposed thereon for providing an all-weather vehicle.

9. A motorcycle air bag structure for use on a motorcycle comprising:
   a left side member for guarding a left side of motorcycle;
   a right side member for guarding a right side of a motorcycle;
   a space formed between said left side member and said right side member; and
   air bags being operatively positioned with each of the left and right side members;
   wherein upon a predetermined condition, both said air bags expand into said space.

10. The motorcycle air bag structure for use on a motorcycle according to claim 9, wherein said left side member includes a first end and a distal end, said first end being hinged to a forward frame of said motorcycle for enabling said left side member to be pivoted for permitting ingress and egress to said motorcycle.

11. The motorcycle air bag structure for use on a motorcycle according to claim 9, wherein said right side member includes a first end and a distal end, said first end being hinged to a forward frame of said motorcycle for enabling said right side member to be pivoted for permitting ingress and egress to said motorcycle.

12. The motorcycle air bag structure for use on a motorcycle according to claim 9, wherein said left side member includes a first end, a distal end and is constructed of a predetermined thickness, one of said air bags being disposed within said predetermined thickness during normal use and being expanded outside said left side member upon the occurrence of said predetermined condition into said space.

13. The motorcycle air bag structure for use on a motorcycle according to claim 9, wherein said right side member includes a first end, a distal end and is constructed of a predetermined thickness, one of said air bags being disposed within said predetermined thickness during normal use and being expanded outside said right side member upon the occurrence of said predetermined condition into said space.

14. The motorcycle air bag structure for use on a motorcycle according to claim 9, wherein said predetermined occurrence is an accident that deploys the air bags.

15. The motorcycle air bag structure for use on a motorcycle according to claim 9, wherein said predetermined occurrence is the turning of the motorcycle to a predetermined angle that deploys the air bags.

* * * * *